US008839313B2

(12) United States Patent
Higgins et al.

(10) Patent No.: US 8,839,313 B2
(45) Date of Patent: Sep. 16, 2014

(54) REALTIME BROADCAST STREAM AND CONTROL DATA CONVERSION SYSTEM AND METHOD

(71) Applicant: Encore Interactive Inc., Saint John (CA)

(72) Inventors: Sean Gordon Higgins, Saint John (CA); Derek Joseph Tobias Billingsley, Saint John (CA); Jeffery Louis Furlong, Rothesay (CA); Jared David McNeill, Nepean (CA)

(73) Assignee: Encore Interactive Inc., Saint John (CA)

( * ) Notice: Subject to any disclaimer, the term of this patent is extended or adjusted under 35 U.S.C. 154(b) by 89 days.

(21) Appl. No.: 13/735,168

(22) Filed: Jan. 7, 2013

(65) Prior Publication Data

US 2013/0125170 A1 May 16, 2013

Related U.S. Application Data

(62) Division of application No. 13/104,776, filed on May 10, 2011, now Pat. No. 8,352,990.

(60) Provisional application No. 61/333,234, filed on May 10, 2010.

(51) Int. Cl.
| | | |
|---|---|---|
| *H04N 5/445* | (2011.01) | |
| *H04N 21/482* | (2011.01) | |
| *H04N 21/6437* | (2011.01) | |
| *H04N 5/76* | (2006.01) | |
| *H04N 21/436* | (2011.01) | |
| *H04N 21/435* | (2011.01) | |
| *H04L 29/06* | (2006.01) | |
| *H04N 5/781* | (2006.01) | |
| *H04N 21/4402* | (2011.01) | |
| *H04N 5/783* | (2006.01) | |
| *H04N 21/4147* | (2011.01) | |

(52) U.S. Cl.
CPC ....... *H04N 21/4823* (2013.01); *H04N 21/6437* (2013.01); *H04N 5/76* (2013.01); *H04N 21/436* (2013.01); *H04N 21/4355* (2013.01); *H04L 65/4076* (2013.01); *H04N 5/781* (2013.01); *H04N 21/440218* (2013.01); *H04N 5/783* (2013.01); *H04N 21/4147* (2013.01)
USPC .............................................. 725/80; 725/39

(58) Field of Classification Search
CPC .................. H04N 21/4355; H04N 21/440218; H04N 21/4823; H04N 21/6437
See application file for complete search history.

(56) References Cited

U.S. PATENT DOCUMENTS

| | | |
|---|---|---|
| 5,241,428 A | 8/1993 | Goldwasser |
| 5,757,417 A | 5/1998 | Aras |

(Continued)

FOREIGN PATENT DOCUMENTS

| | | |
|---|---|---|
| CA | 2321805 | 3/2002 |
| CA | 2334203 | 1/2004 |

(Continued)

*Primary Examiner* — Rong Le
(74) *Attorney, Agent, or Firm* — IP-MEX Inc.; Victoria Donnelly

(57) ABSTRACT

A system that delivers live broadcast media to consumer devices, including a system for enabling devices without native capabilities such as internal bulk storage and stream processing, to have command and control of live broadcast streams, has been provided. This is achieved through intercepting and converting the normal service provider channel mapping data to a new channel map which points to a software system that delivers command and control of live broadcast media, and implementation of a software system which can receive a channel change protocol, establish a command and control session with the device, convert the channel map protocol to the original format, tune in, receive, convert and process the live stream so that it can be delivered to the requesting device and in turn be controlled by user interaction with that device or the software system. A corresponding method is also provided.

20 Claims, 8 Drawing Sheets

(56) References Cited

U.S. PATENT DOCUMENTS

| | | |
|---|---|---|
| 5,872,588 A | 2/1999 | Aras |
| RE36,801 E | 8/2000 | Logan |
| 6,169,541 B1 | 1/2001 | Smith |
| 6,184,877 B1 | 2/2001 | Dodson |
| 6,215,526 B1 | 4/2001 | Barton |
| 6,233,389 B1 | 5/2001 | Barton |
| 6,285,746 B1 | 9/2001 | Duran |
| 6,310,886 B1 | 10/2001 | Barton |
| 6,327,418 B1 | 12/2001 | Barton |
| 6,385,739 B1 | 5/2002 | Barton |
| 6,487,646 B1 | 11/2002 | Adams |
| 6,490,722 B1 | 12/2002 | Barton |
| 6,535,253 B2 | 3/2003 | Barton |
| 6,642,939 B1 | 11/2003 | Vallone |
| 6,643,798 B2 | 11/2003 | Barton |
| 6,674,960 B2 | 1/2004 | Duran |
| 6,681,396 B1 | 1/2004 | Bates |
| 6,721,953 B1 | 4/2004 | Bates |
| 6,728,713 B1 | 4/2004 | Beach |
| 6,757,837 B1 | 6/2004 | Platt |
| 6,757,906 B1 | 6/2004 | Look |
| 6,792,195 B2 | 9/2004 | Barton |
| 6,847,778 B1 | 1/2005 | Vallone |
| 6,850,691 B1 | 2/2005 | Stam |
| 6,868,225 B1 | 3/2005 | Brown |
| 6,965,730 B2 | 11/2005 | Chamberlin |
| 7,055,031 B2 | 5/2006 | Platt |
| 7,158,531 B2 | 1/2007 | Barton |
| 7,200,321 B2 | 4/2007 | Otala |
| 7,216,235 B1 | 5/2007 | Platt |
| 7,228,556 B2 | 6/2007 | Beach |
| 7,263,610 B2 | 8/2007 | Parker |
| 7,272,298 B1 | 9/2007 | Lang |
| 7,321,716 B1 | 1/2008 | Vallone |
| 7,324,542 B2 | 1/2008 | Furlong |
| 7,409,546 B2 | 8/2008 | Platt |
| 7,484,234 B1 | 1/2009 | Heaton |
| 7,493,015 B1 | 2/2009 | Van Stam |
| 7,529,465 B2 | 5/2009 | Barton |
| 7,543,325 B2 | 6/2009 | Westbrook |
| 7,558,472 B2 | 7/2009 | Locket et al. |
| 7,590,240 B2 | 9/2009 | Platt |
| 7,643,508 B2 | 1/2010 | Furlong |
| 7,661,121 B2 | 2/2010 | Smith |
| 7,668,914 B2 | 2/2010 | Parker |
| 7,779,437 B2 | 8/2010 | Barton |
| 7,840,986 B2 | 11/2010 | Ali |
| 7,861,258 B2 | 12/2010 | Barton |
| 7,873,982 B2 | 1/2011 | Smith |
| 7,877,768 B2 | 1/2011 | Beach |
| 7,882,520 B2 | 2/2011 | Beach |
| 7,895,633 B2 | 2/2011 | Van Hoff |
| 7,908,635 B2 | 3/2011 | Barton |
| 7,934,170 B2 | 4/2011 | Fulcher |
| 2001/0019658 A1 | 9/2001 | Barton |
| 2002/0118954 A1 | 8/2002 | Barton |
| 2002/0199194 A1 | 12/2002 | Ali |
| 2003/0014759 A1 | 1/2003 | Van Stam |
| 2003/0026589 A1 | 2/2003 | Barton |
| 2003/0037333 A1 | 2/2003 | Ghashghai |
| 2003/0131252 A1 | 7/2003 | Barton |
| 2003/0131359 A1 | 7/2003 | Moskowitz |
| 2003/0182567 A1 | 9/2003 | Barton |
| 2004/0013406 A1 | 1/2004 | Barton |
| 2004/0046780 A1 | 3/2004 | Beaton |
| 2004/0060061 A1 | 3/2004 | Parker |
| 2004/0088729 A1 | 5/2004 | Petrovic |
| 2004/0223747 A1 | 11/2004 | Otala |
| 2005/0028206 A1 | 2/2005 | Cameron |
| 2005/0076359 A1 | 4/2005 | Pierson |
| 2005/0108519 A1 | 5/2005 | Burton |
| 2005/0108769 A1 | 5/2005 | Arnold |
| 2005/0125743 A1 | 6/2005 | Beaton |
| 2005/0132418 A1 | 6/2005 | Barton |
| 2005/0216942 A1 | 9/2005 | Barton |
| 2005/0246738 A1 | 11/2005 | Lockett |
| 2005/0251750 A1 | 11/2005 | Vallone |
| 2005/0262539 A1 | 11/2005 | Barton |
| 2005/0273828 A1 | 12/2005 | Barton |
| 2005/0278747 A1 | 12/2005 | Barton |
| 2006/0127039 A1 | 6/2006 | Van Stam |
| 2006/0235800 A1 | 10/2006 | Furlong |
| 2006/0248558 A1 | 11/2006 | Barton |
| 2007/0101381 A1 | 5/2007 | Furlong |
| 2007/0118730 A1 | 5/2007 | Platt |
| 2007/0130597 A1 | 6/2007 | Parker |
| 2007/0150926 A1* | 6/2007 | Zuo ........................ 725/100 |
| 2007/0186003 A1 | 8/2007 | Foster |
| 2007/0212025 A1 | 9/2007 | Barton |
| 2007/0220554 A1 | 9/2007 | Barton |
| 2007/0300261 A1 | 12/2007 | Barton |
| 2007/0300263 A1 | 12/2007 | Barton |
| 2008/0098323 A1 | 4/2008 | Vallone |
| 2008/0107402 A1 | 5/2008 | Angiolillo |
| 2008/0109298 A1 | 5/2008 | Barton |
| 2008/0118227 A1 | 5/2008 | Barton |
| 2008/0145034 A1 | 6/2008 | Barton |
| 2008/0155417 A1 | 6/2008 | Vallone |
| 2008/0155418 A1 | 6/2008 | Vallone |
| 2008/0172689 A1 | 7/2008 | Feder |
| 2008/0247541 A1* | 10/2008 | Cholas et al. ............ 380/200 |

FOREIGN PATENT DOCUMENTS

| | | |
|---|---|---|
| CA | 2321462 | 4/2004 |
| CA | 2319992 | 5/2004 |
| CA | 2446852 | 11/2005 |
| EP | 1086589 | 12/1999 |
| EP | 1842337 | 7/2006 |
| EP | 1517559 | 7/2008 |
| WO | WO2007069087 | 6/2007 |

* cited by examiner

REALTIME BROADCAST STREAM AND CONTROL DATA CONVERSION SYSTEM AND METHOD

RELATED APPLICATIONS

The present application is a Divisional of U.S. application Ser. No. 13/104,776 filed on May 10, 2011, now issued U.S. Pat. No. 8,352,990 issued on Jan. 8, 2012, which claims benefit from the U.S. provisional application Ser. No. 61/333,234 filed on May 10, 2010 for "REALTIME BROADCAST STREAM AND CONTROL DATA CONVERSION SYSTEM AND METHOD", entire contents of the above noted patent and applications are incorporated herein by reference.

FIELD OF THE INVENTION

The present invention relates to systems for the real time delivery of multimedia data, specifically broadcast video.

BACKGROUND OF THE INVENTION

Advanced command and control of live streams is a key feature in the delivery of new multimedia services into the home. Current mechanisms for command and control of Live television (TV) delivery requires in-device bulk storage, buffering, and implementation of stream command and control intelligence in the device itself. Devices which have these capabilities are for example personal video recorder (PVR) or personal computers (PC). This requirement adds considerable expense for service providers who have deployed legacy devices, for example set-top boxes for subscriber terminals (ST), which do not have such capabilities. In addition as more and more devices become network connected and these features continue as desired functionality, this will drive additional cost in those devices, for example, upgraded devices if the native capability needs to be built-in.

With a goal of enabling this functionality on new inexpensive devices as well as on legacy devices, an improved system and method for interactively delivering broadcast video from a service provider network to one or more subscriber terminals needs to be developed.

The existing prior art primarily deals with the implementation of in-device stream processing, command and control implementation internally within that device. For example, existing consumer electronic PVR implementations receive the live stream into internal buffers and command and control is provided to that device by intercepting remote control commands associated with that stream. While this implementation works for a single viewing device, one television set for example, it will not work for implementation of live command and control for other devices, i.e. multiple viewing devices, or for devices that were not designed with this native capability in mind such as many existing STs.

Therefore there is a need in the industry for developing a system and methods which would avoid the shortcomings of the prior art, and allow economies to be obtained when more than one device is to be served from a single provider network access point.

SUMMARY OF THE INVENTION

Therefore there is an object of the invention to provide a system and method for interactively delivering broadcast video from a service provider network to one or more subscriber terminals.

According to one aspect of the invention, there is provided a system for processing a broadcast stream, carrying video channels and an electronic program guide (EPG) information, and for distributing same over a local area network to a plurality N of subscriber terminals (STs), the system comprising:

a computer readable storage medium having computer readable instructions stored thereon for execution by a processor, forming:

(a) a plurality of N broadcast tuners, each broadcast tuner being configured for tuning in one of the video channels of the broadcast stream;

(b) an EPG tuner for extracting the EPG information from the broadcast stream; and (c) a multichannel proxy module, comprising:
  (i) a live conversion system for buffering and processing said tuned-in video channels, including providing normal play and trick play functions for each video channel;
  (ii) an EPG conversion sub-system for converting the EPG information into a format suitable for transmission over the local area network; and
  (iii) a streaming control sub-system for transmitting each buffered and processed video channel to a corresponding ST and for controlling the normal play and trick play functions of said buffered and processed video channel by the ST.

In the system described above, the EPG conversion sub-system comprises:

a Tuner Interface for periodically receiving the EPG information from the EPG tuner; and a Parsing Module for converting the received EPG information as a channels file, and storing the channels file into a channels files memory.

The EPG conversion sub-system further comprises:

a format conversion module for converting the channels file into a converted channel map; and a Local network input/output (I/O) module for sending the converted channel map to each ST.

The EPG conversion sub-system further comprises a control program module and a timer module for periodically updating the converted channel map.

In the embodiments of the invention, the live conversion system comprises:

a media buffer, operatively coupled to the N broadcast tuners for buffering respective media payloads for the tuned-in video channels;

a key index table for storing respective media buffer maps indexing the media buffer for each tuned-in video channel.

The live conversion system further comprises:

a realtime processing module for providing the normal play and trick play functions for each respective video channel, including processing the media payloads using the respective media buffer maps; and an output buffer for accumulating a predetermined number of media packets contained in the media payloads for transmission to the respective STs in a form of network packets.

In the embodiments of the invention:

the realtime processing module comprises a plurality of N realtime processing function units; and the media buffer, the key index table, and the output buffer, are each partitioned into N sections, each section being assigned to a respective one of the N realtime processing function units.

The realtime processing module further comprises:
a normal play module for providing the normal play function; and
a trick play module for providing the trick play function; for use by any of the realtime processing function units upon a command from a corresponding ST.

In the embodiments of the invention, the streaming control sub-system is configured for implementing a Real Time Streaming Protocol (RTSP).

The streaming control sub-system comprises:
an RTSP conversion subsystem operatively coupled to the N broadcast tuners; and
a plurality of N RTSP session units operatively connected to the RTSP conversion subsystem, and to corresponding STs over respective Media Links and respective control and command (CC) links for enabling each ST to control a corresponding one of the N broadcast tuners.

The plurality of N RTSP session units is further connected to the live conversion system forwarding the processed video channels to respective STs.

In the system described above, the broadcast stream is one of the following:
is carried as an Internet Protocol Television (IPTV) stream;
is a multi-channel cable television signal;
is a multi-channel satellite television signal;
is a multi-channel terrestrial television signal.

According to another aspect of the invention, a method for processing a broadcast stream carrying video channels and an electronic program guide (EPG) information, and for distributing same over a local area network to a plurality N of subscriber terminals (STs), the method comprising:
(a) under control of the STs, tuning a plurality of N corresponding broadcast tuners into the video channels of the broadcast stream;
(b) extracting the EPG information from the broadcast stream;
(c) buffering and processing said tuned-in video channels, including providing play modes including normal play and trick play for each buffered and processed video channel;
(d) converting the EPG information into a format suitable for transmission over the local area network to the STs for controlling the normal play and trick play functions by the STs; and
(e) transmitting the buffered and processed video channels to corresponding STs.

In the method described above, the processing comprises indexing the buffered tuned-in channels for supporting the normal play and the trick play modes.

The processing further comprises controlling the play mode of each tuned-in video channel by a corresponding ST.

In the method described above:
the step (b) further comprises periodically receiving the EPG information;
the step (d) further comprises:
parsing the received EPG information as a channels file; and
converting the channels file into the format of a converted channel map suitable for the transmission to each ST over the local area network.

In the method described above:
the step (b) further comprises identifying the EPG information related to video channels with respective local network addresses; and
the step (a) further comprises identifying video channels with said respective local network addresses for communicating a selection of video channels by respective STs to corresponding broadcast tuners.

The step (c) further comprises buffering and processing the tuned-in video channels identified with said respective local network addresses.

The step (c) further comprises distributing the buffered and processed channels as a Real Time Streaming Protocol (RTSP) stream.

Yet additionally, the step (c) comprises:
launching a plurality of N RTSP sessions for corresponding STs;
establishing RTSP control and command (CC) links between STs and respective broadcast tuners for selecting video channels in respective broadcast tuners and for transmitting the buffered and processed video channels to the STs.

In the method described above, the broadcast stream is carried as one of the following:
an Internet Protocol Television (IPTV) stream;
a multi-channel cable television signal;
a multi-channel satellite television signal;
a multi-channel terrestrial television signal.

The step (e) comprises:
(f) establishing a RTSP session;
(g) creating a media buffer for buffering media packets from each tuned-in video channel;
(g) creating an output buffer for storing the buffered and processed video channels for each respective subscriber terminal;
(h) estimating a stream bit rate of each tuned-in video channel;
(i) sending the contents of the output buffer in the form of network packets to the associated subscriber terminal substantially at the stream bit rate.

The step (d) comprises converting the EPG information into a Real Time Streaming Protocol (RTSP) control and command (CC) format.

According to yet another aspect of the invention, there is provided a method of processing an electronic program guide (EPG) information for use in live command and control for channel tuning and for control of a video play mode by a plurality of N subscriber terminals, the method:
(a) connecting the subscriber terminals (STs) to a video broadcast subscriber link through a live conversion system controlling live streaming of a video;
(b) receiving a broadcast stream and an EPG channel on the broadcast subscriber link;
(c) joining the EPG channel in an EPG tuner;
(d) reading an EPG information on the EPG channel and constructing from the EPG information a channels file comprising a set of channels definitions;
(e) parsing the channels file;
(f) converting the channels file to a converted channel map in a control and command format;
(g) sending the converted channel map to each ST; and
(h) repeating the steps (d) to (g) at predetermined time intervals.

In the method described above:
the step (b) comprises processing the received broadcast stream and transmitting the processed broadcast stream by using a RTSP protocol; and
the step (f) comprises converting the control and command format into a Real Time Streaming Protocol (RTSP) control and command (CC) format.

Thus, an improved realtime broadcast stream and control data conversion system and method have been provided.

BRIEF DESCRIPTION OF THE DRAWINGS

Embodiments of the invention will now be described, by way of example, with reference to the accompanying drawings, in which.

DESCRIPTION OF THE EMBODIMENTS OF THE INVENTION

Embodiments of the present invention relate to a proxy system that is interposed between the service provider network and one or more subscriber terminals (ST) and corresponding methods of operation.

GLOSSARY OF TERMS

IPTV—Internet Protocol Television—used to describe the technology for delivery of broadcast television services using IP as a delivery protocol PVR/DVR—Personal or Digital Video Recorder ST—Subscriber Terminal CC—Command and Control—This term is used to describe technologies which allow a user to control behavior of a media stream (i.e. pause, fast forward, rewind, etc.)

EPG—Electronic Program Guide

RTSP—Real Time Streaming Protocol—RFC 2326—A an IP protocol which can be used for streaming command and control among other things URL—Universal Resource Locator UDP—User Datagram Protocol MPEG2—ISO 13818-1, 2, 3—The Motion Picture Experts Group standard that describes systems (−1), Video compression (−2) and Audio compression (−3)

PMT—Program Map Table—a data structure used to describe information in a Mpeg2 transport stream (ISO 13818-1)

PAT—Program Access Table—similar to PMT but contains information regarding programs carried in the transport stream PID—Program Identifier—unique identifier associated with each video, audio or data program carried in a transport stream PTS—Program Time Stamp—Timestamp used to tell decoder when to present decoded information DTS—Decode Time Stamp—Timestamp used to tell decoder when to decode encoded data IO—Input Output—industry term for describing in/out throughput of a particular system TS—Transport Stream—generic term used to refer to ISO 13818-1 streams ECM—Entitlement Control Message—In stream data used to allow end systems to decrypt encrypted streams PCR—Program Clock Reference—Instream clock reference which allows decoding systems to recreate clocking system in decoder and perform other operations relevant to that reference DRM—Digital Rights Management—generic term to describe copyright and purchasing protection systems which encrypt media and then decrypt at client devices for consumption.

Figure 1:
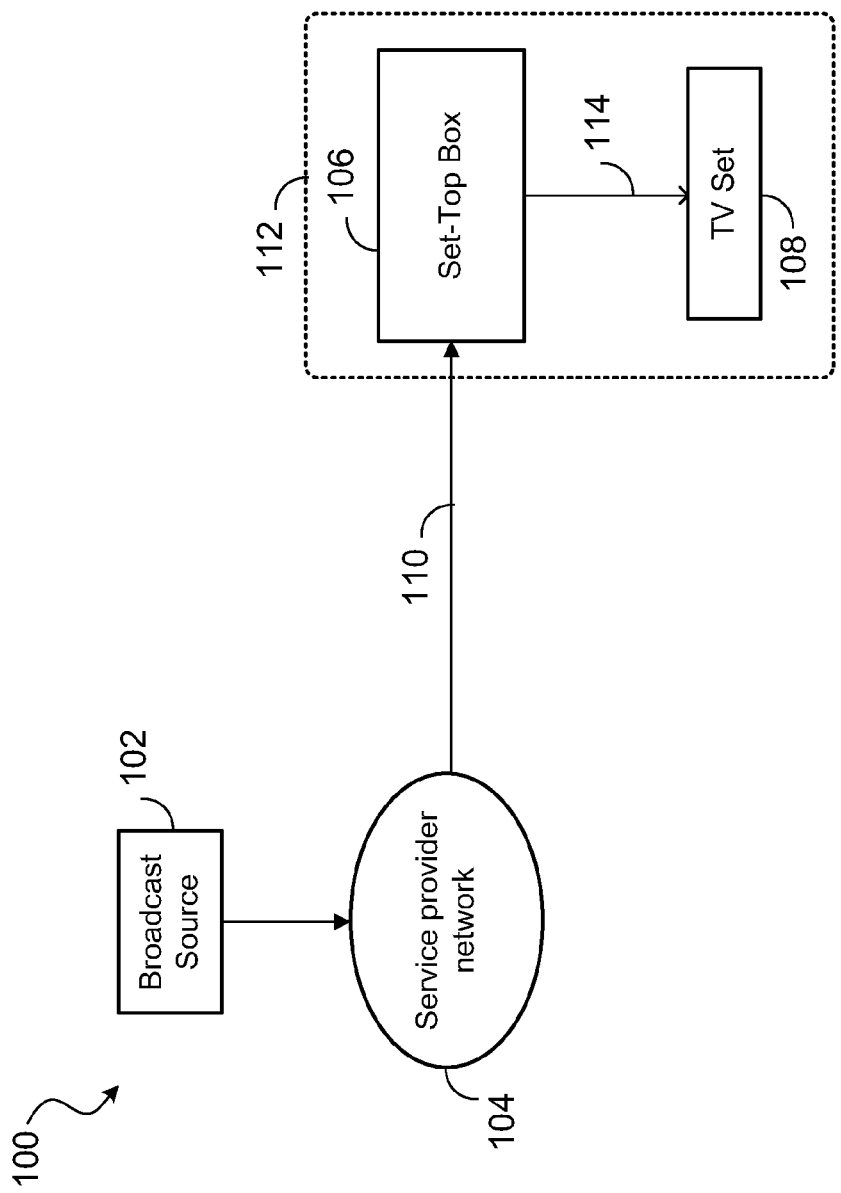
FIG. 1 shows a typical simple broadcast television system 100 of the prior art.

FIG. 1 shows a typical simple broadcast television system 100 of the prior art, including a Broadcast Source 102, a Service Provider Network 104, a Set-Top Box 106, and a TV Set 108. Broadcast television signals are distributed from the Broadcast Source 102, for example a cable head end, through the Service Provider Network 104 over a broadcast subscriber link (also referred to simply as a subscriber link) 110, for example a cable-drop to a subscriber location 112 where the Set-Top Box 106 and the TV Set 108 are located. Alternatively, the subscriber link 110 may be a wireless link, directly from a broadcast satellite to the subscriber location 112. In both these simple cases, the subscriber link 110 is a link carrying broadcast media signals (TV channels) and an electronic program guide (EPG). In more advanced systems of the prior art including IPTV systems an upstream control channel may also exist which permits the subscriber (through the Set-Top Box 106) to remotely control channel selection.

The TV Set 108 receives a selected TV channel, and/or a channel carrying the EPG (and EPG channel) from the Set-Top Box 106 over a TV-link 114. Channel selection in the Set-Top Box 106 may be controlled with an infra-red remote unit, for example.

A more advanced Set-Top Box 106 of the prior art, such as a Personal or Digital Video Recorder (PVR or DVR) may include a bulk storage medium such as a hard disk for recording and playback of broadcast media signals, and may also include capabilities for "trick play" such as rewind, fast forward etc.

The diagram of FIG. 1 is also intended to describe a simple IPTV system in which the Service Provider Network 104 may be replaced by the internet, and the subscriber link 110 would include one or more virtual connections over which individual broadcast channels would be streamed, the virtual channel selection being performed through the Set-Top Box 106.

Figure 2:
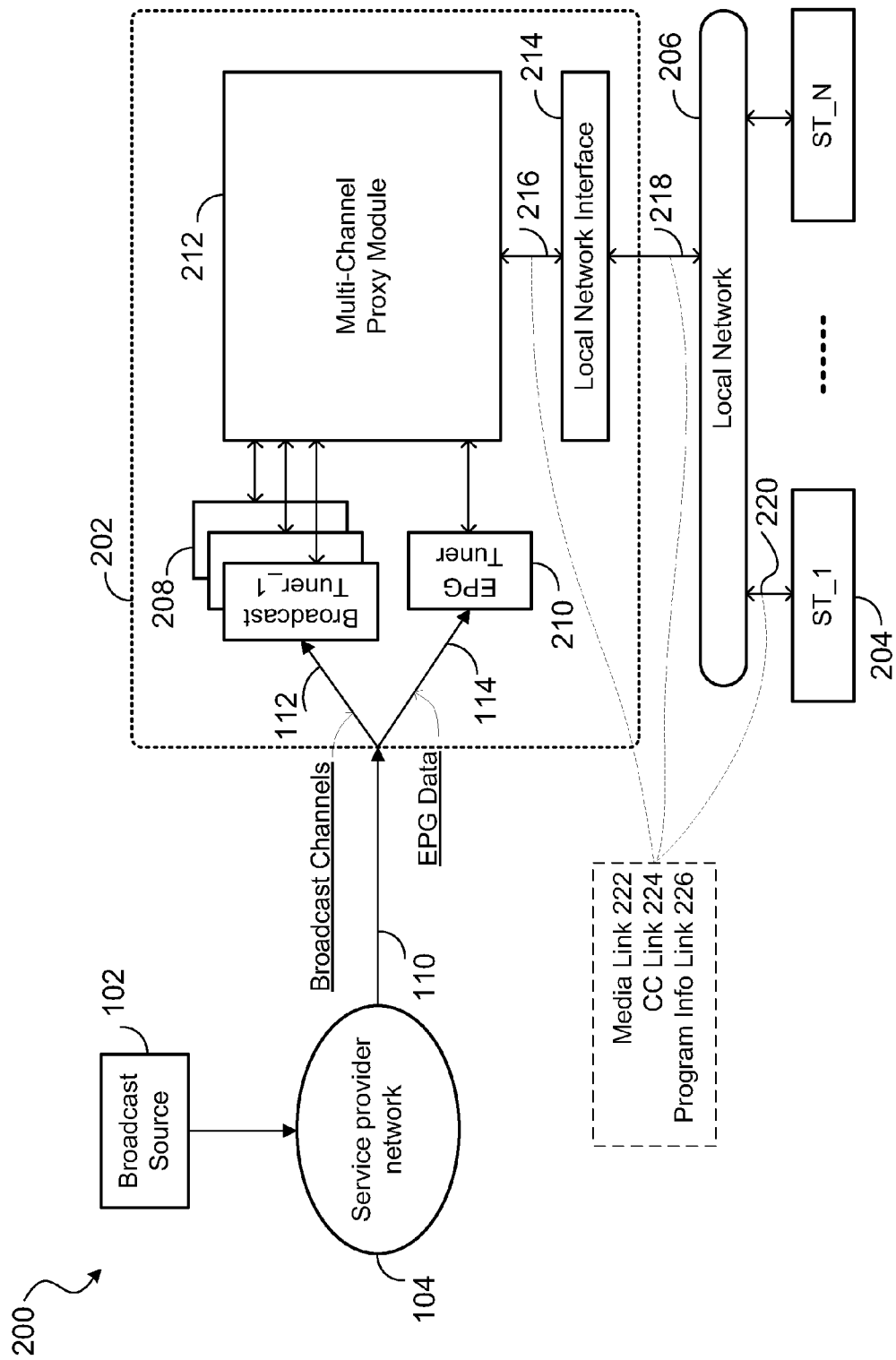
FIG. 2 shows a system diagram 200 according to an embodiment of the invention, including the Broadcast Source 102 and the Service Provider Network 104 of FIG. 1; a Realtime Broadcast Stream and Control Data Conversion System for Control of Live Streaming (also referred to as a Proxy System) 202; and a number of "N" Subscriber Terminals 204 (ST_1 to ST_N)

FIG. 2 shows a system diagram 200 according to an embodiment of the invention, including the Broadcast Source 102 and the Service Provider Network 104 of FIG. 1; a Realtime Broadcast Stream and Control Data Conversion System for Control of Live Streaming (also referred to as a Proxy System) 202; and a number of "N" Subscriber Terminals 204 (ST_1 to ST_N) which may be connected to the Proxy System 202 over a Local Network 206.

The Proxy System 202 includes one or more Broadcast Tuners 208; an Electronic Program Guide (EPG) Tuner 210; a Multi-Channel Proxy Module 212; and a Local Network Interface 214. The Proxy System 202 comprises computer readable storage medium, for example, memory, CD-ROM, DVD or the like, having computer readable instructions and data stored thereon for execution by a processor. The number of Broadcast Tuners 208 is preferably, but not necessarily at least as high as the number "N" of Subscriber Terminals 204, to permit each Subscriber Terminal 204 to simultaneously receive a different live broadcast channel.

The Service Provider Network 104 sends data of two types to the Proxy System 202, a plurality "M" of media broadcast channels 112, and an Electronic Program Guide (EPG) channel 114 which comprises information about the broadcast channels 112. The term "channel" is used here in the broadest sense, to describe distinct communications paths over a common physical medium, including frequency division multiplex (FDM) channels, spread spectrum channels, and channels created by virtual connections on a packet network.

It is understood that the Broadcast Tuners 208 may be individual hardware, firmware or software modules; they may be implemented as individual tuners, each able to tune into any of the video channels of the broadcast stream; they may be also combined into a multi-channel tuner able to tune into several channels simultaneously to provide "N" channel streams for the "N" STs 204.

It is further understood that broadcasting of the EPG information on the EPG channel 114 may be repeated and updated periodically or at predetermined intervals. In some broadcast systems, the EPG channel 114 may be similar in modulation and formats to a video channel. Alternatively, it may be distributed in a time multiplexed manner with the broadcast channels 112. It is an objective that the EPG Tuner 210 be adapted to extract the EPG information regardless of the presentation method.

Each of the Subscriber Terminals 204 receives program information and selected program data from the Proxy System 202 over individual local network (virtual) connections provided by the Local Network 206 which may be a wired Ethernet Local Area Network (LAN) or a wireless local network (wireless LAN).

Alternatively, and depending on the nature of the Subscriber Terminals 204, for example legacy subscriber terminals with proprietary interfaces, other types of links and protocols may also be employed to connect the Subscriber Terminals 204 with the Proxy System 202.

The Local Network Interface 214 is adapted to connect the Multi-Channel Proxy Module 212 to the Local Network 206 according to protocols used for communicating with the Subscriber Terminals 204 over the specific type of network embodied in the Local Network 206.

The connection between each Subscriber Terminal 204 and the Multi-Channel Proxy Module 212 is provided in (virtual) data links which are carried on multiplexed links 216, 218, and 220, respectively coupling: the Multi-Channel Proxy Module 212 to the Local Network Interface 214; the Local Network Interface 214 to the Local Network 206; and the Local Network 206 to each ST 204. Each of the multiplexed links 216, 218, and 220 carries: a Media Link 222 for delivering a media stream from the Multi-Channel Proxy Module 212 to each of the STs 204; a Command and Control (CC) Link 224 for providing the Subscriber Terminals 204 with certain control capabilities; and a Program Information Link 226 for disseminating a converted Electronic Program Guide to the Subscriber Terminals 204.

While it is an objective of the invention to provide enhanced capabilities through the Proxy System 202 to many kinds of subscriber terminals, it should be noted that there are certain base capabilities for the Subscriber Terminals 204 which need to present for the Proxy System 202 in accordance with the embodiments of present invention to work.

These are as follows.

The STs 204 should have the ability to decode and display the audio and video currently deployed by the service provider as described in this invention. This also includes the ability to interact with Digital Rights Management (DRM) systems to enable decryption and decoding of encrypted signals.

The STs 204 should have the ability to implement some type of command and control protocol for interaction with the Proxy System 202. This is typically the same command and control protocol they would use for interacting with a video on demand system but could also be commands interpreted from a remote control device or a new protocol implemented specifically for this purpose, that is for interacting with a proxy for command and control of live streaming.

The STs 204 should have the ability to launch a command and control session with the Proxy System 202 concurrent with tune in to a live broadcast channel.

BRIEF DESCRIPTION OF THE EMBODIMENTS OF THE INVENTION

In a system providing multimedia broadcast (via over the air digital radio frequency (RF) broadcast using digital quadrature amplitude modulation (QAM), Internet Protocol (IP) multicast, or other) where in home user control of these live streams is conventionally provided only by devices with native (bulk storage and stream processing capability) capability to do so, the embodiments of the present invention provide a method and system for enabling command and control of live streams for a plurality of such devices through intelligent interception and conversion of channel mapping data combined with a similarly intelligent interception conversion and processing of live streams to correspond to the channel mapping data.

For a system containing a subscriber terminal (an ST 204) which receives broadcast multimedia and a corresponding channel mapping data file from a Service Provider Network 104, a Proxy System 202 (in home or network based) is deployed for performing the following operations to enable live stream command and control on the device which previously may not have had those capabilities. The Proxy system 202 comprises a memory storing computer readable instructions for execution by a processor to form a multichannel proxy module 212, broadcast tuners 208, electronic program guide tuner 210 and local network interface 216. Alternatively, the broadcast tuners 208, the EPG tuner and the local network interface 214 may be implemented in hardware or firmware. The operations of the Proxy system 202 include the following:

a) Interception, conversion and delivery of channel mapping data to inform the ST 204 where the command and control live streams can be accessed;

b) Creation of a realtime streaming conversion map based upon the channel mapping converted data;

c) Implementation of a system that receives a command and control (CC) request from an ST 204 for a live channel, converts the request to an original live broadcast stream channel access request (i.e multicast or broadcast channel tune in), receives the stream and converts and/or processes it as necessary to deliver to the requesting ST 204 the live stream, including providing a command and control capability for the stream.

It should be noted that while the embodiments of the invention describe the current implementation, which leverages protocols deployed in an Internet Protocol Television (IPTV) service, it is understood that the scope of the embodiments of the invention is also applicable to cable or satellite service providers. The command and control protocol described in this implementation of the command and control link 224 is the Real Time Streaming Protocol (RTSP) described in an Internet Engineering Task Force (IETF) standard RFC 2326 (RTSP), but could be replaced with another standard, for example Digital storage media command and control (DSMCC), which is an International Telecommunications Union (ITU) standard, or a service specific proprietary implementation. In addition, delivery and streaming protocols can be IP based (multicast and unicast) as described in this implementation or can be RF based, for example, quadrature amplitude modulation (QAM) carriers.

Furthermore, the Proxy System 202 may be configured as a Media Server as specified by the Digital Living Network Alliance (DNLA) to provide content transformation between the media formats received on the subscriber link 110 and the multiplexed link 220 connecting to a ST 204, which may be a DNLA home network device or a mobile hand held device.

Figure 3:
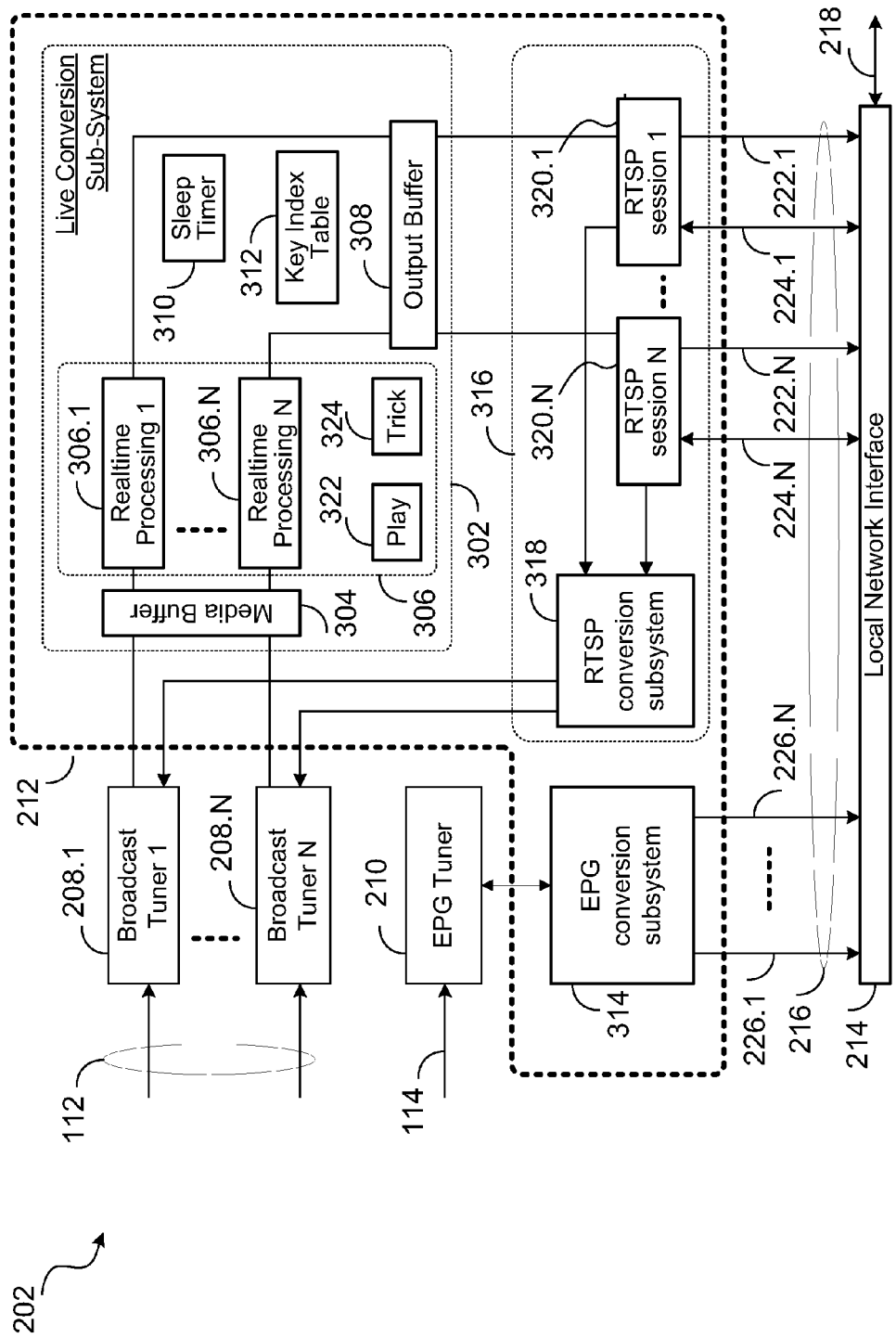
FIG. 3 is a functional block diagram of the Proxy System 202 of FIG. 2, including a simplified block diagram of the Multi-Channel Proxy Module 212.

FIG. 3 is a functional block diagram of the Proxy System 202 of FIG. 2, including a simplified block diagram of the Multi-Channel Proxy Module 212 according to an embodiment of the invention. This example system is abstracted from many implementation details and applies across the spectrum of service provider broadcast delivery solutions.

The Proxy System 202 comprises the plurality N of Broadcast tuners 208.$i$ (208.1 to 208.N) and the EPG Tuner 210 and the Multi-Channel Proxy Module 212. For example, in the case of the IPTV service, the Broadcast Tuners 208 and the EPG Tuner 210 may be implemented as IP Multicast Video Tuners and an IP Multicast EPG Tuner respectively. Other types of Broadcast Tuners and EPG tuners would be used to accommodate cable TV, satellite, or terrestrial wireless broadcasting systems for example.

The Multi-Channel Proxy Module 212 comprises a Realtime Stream Management and Conversion subsystem (also simply referred to as a live conversion sub-system or system) 302 which includes a Media Buffer 304, a Realtime Processing module 306 comprising a plurality of N Realtime Processing function units 306.$i$, i=1 to N, an Output Buffer 308, a Sleep Timer module 310, and a Key Index Table 312. The plurality N of the Realtime Processing units 306.$i$, corresponds to the plurality N of the Broadcast Tuners 208. The Realtime Processing function units 306.$i$ may be instantiated as concurrent tasks sharing the program code of the Realtime Processing module 306, in a conventional multi-tasking software realization of the Multi-Channel Proxy Module 212. The above mentioned modules and units of the Multi-Channel Proxy Module 212 comprises computer readable instructions stored in a computer readable storage medium for execution by a processor.

The Media Buffer 304, the Output Buffer 308, and the Key Index Table 312 are all partitioned into sections (not shown) which are assigned to respective N Realtime Processing function units 306.$i$. The Sleep Timer module 310 provides N independent sleep timer instances (not shown), for use by respective Realtime Processing function units 306.$i$.

Each Broadcast Tuner 208.$i$ is coupled to a corresponding Realtime Processing function unit 306.$i$ through a corresponding partition of the Media Buffer 304.

The Multi-Channel Proxy Module 212 further comprises a Broadcast Channel Mapping Conversion subsystem 314 (also referred to simply as an EPG Conversion Subsystem 314) operatively coupled to the EPG Tuner 210, for receiving the EPG data from the EPG Tuner 210 and converting the EPG Data for transmission over individual Program Information links 226.$i$ (i=1 to N). The individual Program Information links 226.$i$ are multiplexed in the Local Network Interface 214 for transmission over the multiplexed link 218 to corresponding STs 204.

The Realtime Processing module 306 further includes a Normal Play (Play) Module 322 and a Trick Play (Trick) Module 324 to provide respective play and trick play function instances which may be instantiated by the individual Realtime Processing function units 306.$i$ as required when commanded by the corresponding STs 204. The functionality of the Live Conversion Sub-System 302, with respect to normal play implemented in the Normal Play Module 322 and trick play implemented in the Trick Play Module 324, is described in more detail in FIGS. 6 and 7 respectively.

The Multi-Channel Proxy Module 212 further comprises an RTSP control sub-system 316 including a Realtime Command and Control to Broadcast Conversion sub-system 318 (also referred to simply as an RTSP Conversion sub-system 318) and a plurality of N RTSP session units 320, which are realized as instantiated RTSP sessions 320.$i$, the plurality N corresponding to the number of Broadcast Tuner 208 as well as the number of STs 204. Each RTSP session 320.$i$ is coupled to a corresponding ST 204 over a Media Link 222.$i$ and a CC Link 224.$i$, and to a corresponding Realtime Processing function units 306.$i$ through a corresponding partition of the Output Buffer 308.

The individual links 222.$i$ to 226.$i$, i=1 to N, from the Multi-Channel Proxy Module 212 to the Local Network Interface 214 may be virtual links carried in the multiplexed link 216, to be distributed via the Local Network Interface 214 and the Local Network 206 to respective individual STs 204.$i$.

The illustration of the RTSP control sub-system 316 in FIG. 3 is merely shown as an example of a per-ST video streaming control sub-system, which may readily be replaced by other, similar subsystems instantiating different protocols to match the protocols available in the STs 204. Preferably, the protocols used by the STs 204, including HTTP which is currently specified for DLNA compliant subscriber terminal devices, may be automatically detected and provided in the Multi-Channel Proxy Module 212, specifically as an added capability in the EPG Conversion Subsystem 314 and as alternative streaming control subytems to the RTSP control subsystem 316.

It is understood that the RTSP control sub-system 316 may be configured to provide each ST 204 with full access to all broadcast stream channels, but it is also envisaged that access may be limited to selected subsets of broadcast stream channels for some or all STs 204.

The EPG Tuner 210 receives the Electronic Program Guide (EPG) channel 114 from the Service Provider Network 104, and communicates with the EPG Conversion Subsystem 314 which in turn is coupled to the STs 204 over the Program Information Links 226.$i$ for delivery of individual channel mapped data. The RTSP sessions 320.$i$ communicate with the STs 204 and collectively send control and command information to the RTSP Conversion subsystem 318 which in turn controls the individual Broadcast Tuners 208 to select individual broadcast stream channels on behalf of each of the STs 204. The selected broadcast stream channels are sent from the Broadcast Tuners 208 via the corresponding Realtime Processing function units 306.$i$ where they are individually processed, to be forwarded by the corresponding RTSP sessions 320 to the respective STs 204 over the media links 222.

Figure 3A:
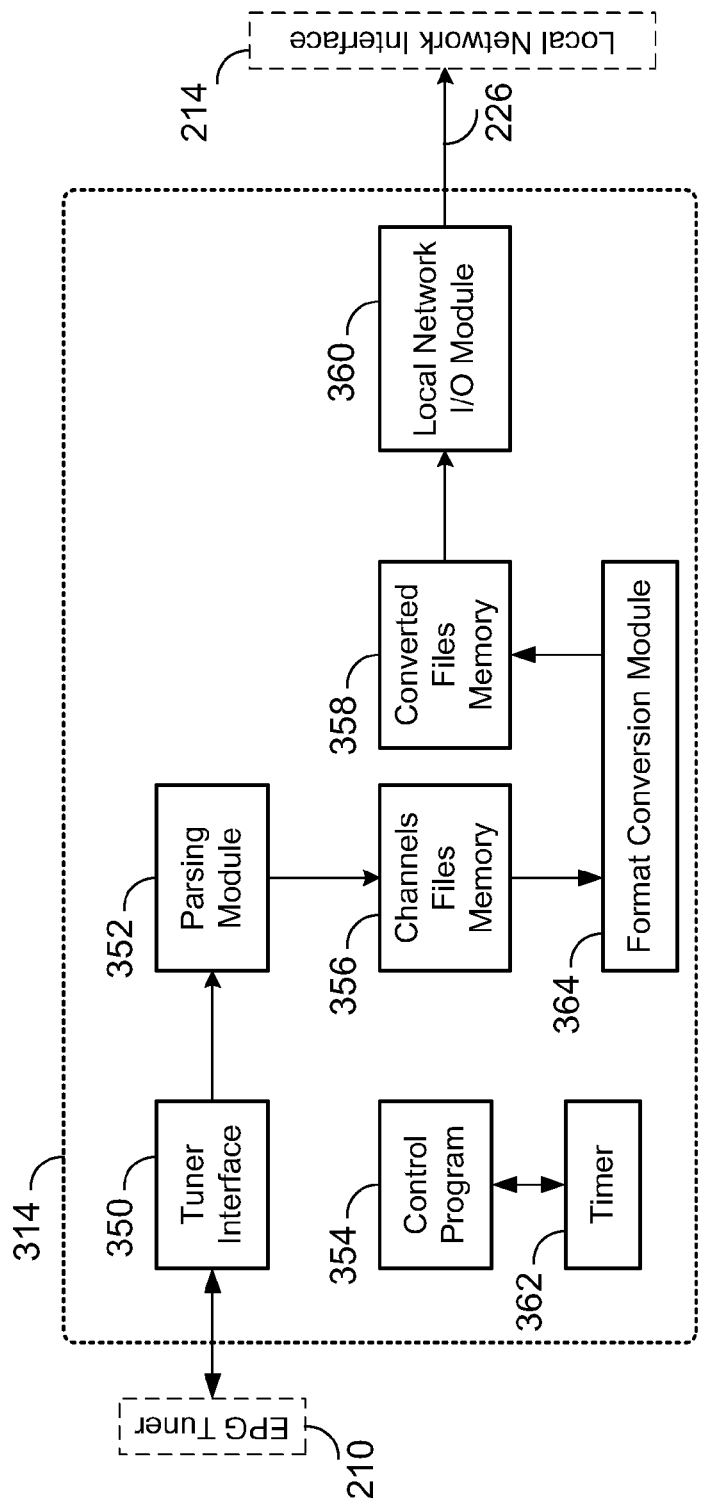
FIG. 3A shows a block diagram of the EPG Conversion Subsystem 314 of FIG. 3.

Various modules of the Proxy System 202, namely the Broadcast Tuners 208, the EPG Tuner 210, the Multi-Channel Proxy Module 212, and the Local Network Interface 214, including respective modules and units as shown in FIGS. 2, 3 and 3a, comprise a computer readable non-transitory storage medium, such as memory, having computer readable instructions stored thereon for execution by a processor. The processor (not shown) may be located at a user's location, at a service provider location where appropriate, or split between the two locations.

Channel Map Conversion

An IP Multicast to RTSP is presented as an example of channel map conversion that is performed in the EPG Conversion Subsystem 314.

FIG. 3A shows a block diagram of the EPG Conversion Subsystem 314, including a Tuner Interface Module 350; a Parsing Module 352; a Control Program Module 354; a Channels Files Memory Module 356; a Converted Files Memory Module 358; a Local Network I/O Module 360; a Timer Module 362; and a Format Conversion Module 364.

The EPG Conversion Subsystem 314 comprises a computer readable non-transitory storage medium, such as memory, having computer readable instructions stored thereon for execution by a processor.

The EPG Conversion Subsystem 314 is designed to receive EPG information from the EPG Tuner 210 in the format provided from the broadcast service provider, convert the EPG information into a converted channel map in the form of a CC-formatted file, and transmit the converted channel map on the Program Information Link 226 via the Local Network Interface 214 to each ST 204. FIG. 3A shows a grouping of software modules (350-364) for implementing the corresponding method shown in FIG. 4 below.

The Tuner Interface Module 350 is adapted to select and receive the EPG information from the EPG Tuner 210 and passes it to the Parsing Module 352. Because the EPG information is transmitted sequentially and periodically from the service provider, it needs to be decoded, parsed, and accumulated.

The Parsing Module 352 converts and formats the received EPG information as a "Channels File" containing a channel map and stores the Channels File into the Channels Files Memory Module 356.

Algorithmic conversion of the Channels File into the channel map in the form of a CC-formatted file is performed in the Format Conversion Module 364, which stores the converted file containing a converted channel map into the Converted Files Memory Module 358.

The Converted Files Memory Module 358 is coupled to the Local Network I/O Module 360 which retrieves the converted channel map and sends it to each of the STs 204 on the respective Program Information Link 226, either individually addressed to each ST 204, or in the form of a broadcast message to all STs 204.

A function of the Control Program Module 354 is to sequence the operation of the EPG Conversion Subsystem 314, specifically to repeatedly acquire the EPG information from the EPG Tuner 210, update the Channels Files Memory Module 356 accordingly, and cause the converted file to be sent to the STs 204. The Timer Module 362 is used to trigger the Control Program Module 354 periodically, to ensure the program information is always up-to-date.

Figure 4:
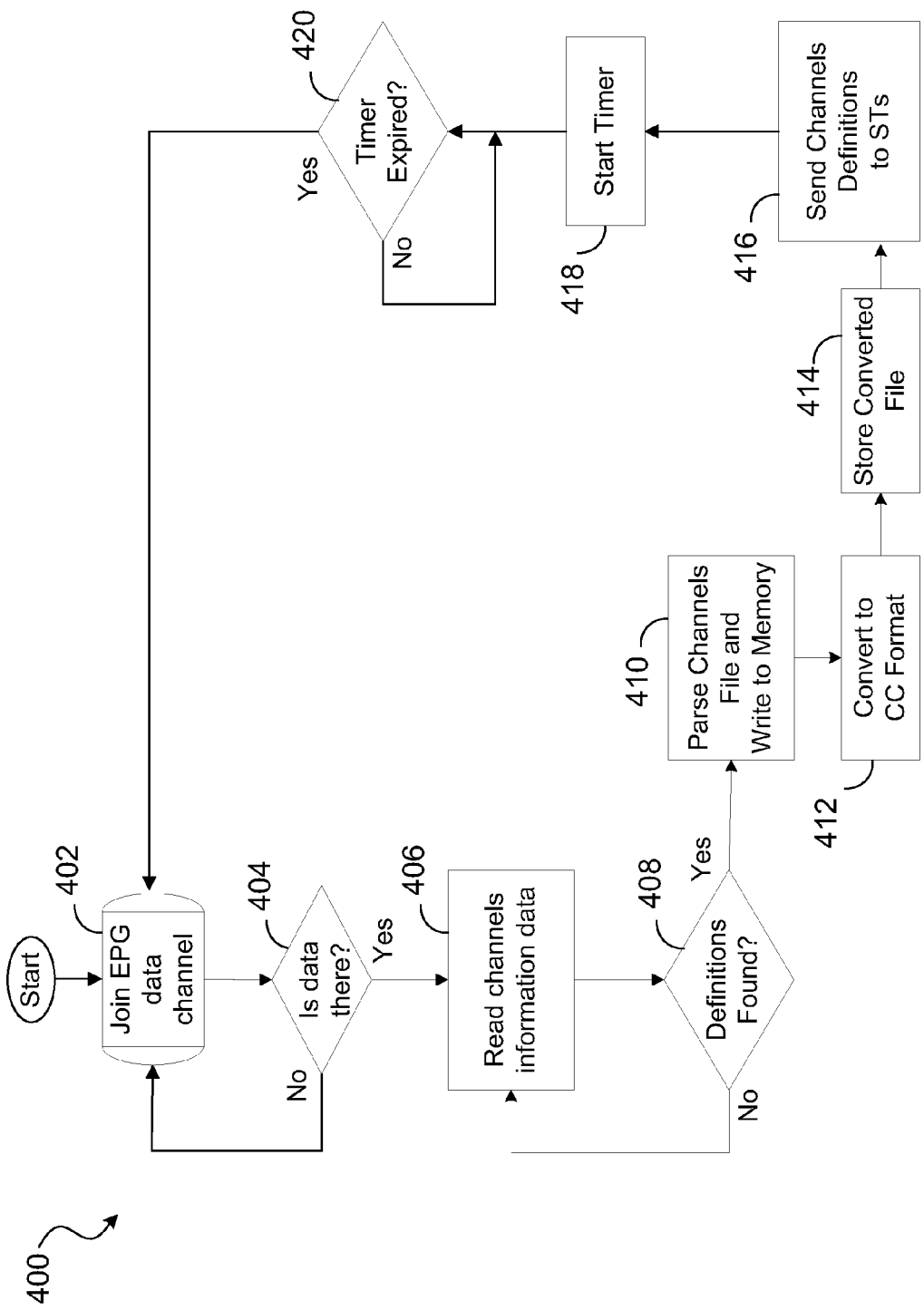
FIG. 4 shows a flowchart of an EPG control data transformation algorithm 400 that takes place in the EPG Tuner 210 of FIG. 2 and the EPG Conversion Subsystem 314 of FIG. 3.

FIG. 4 shows a flowchart of the example of an EPG control data transformation algorithm 400 that takes place in the EPG Tuner 210 and the EPG Conversion Subsystem 314 to allow each ST 204 to receive a converted channel map (part of EPG data) for use in live command and control for channel tuning and for subsequent command and control of video play modes.

The steps in the data conversion process are as follows:
a step 402: "Join EPG data channel";
a step 404: "Data is there?";
a step 406: "Read channels information data";
a step 408: "Definitions Found?";
a step 410: "Parse Channels File and Write to Memory";
a step 412: "Convert to CC Format";
a step 414: "Store Converted File";
a step 416: "Send Channels Definitions to STs";
a step 418: "Start Timer"; and
a step 420 "Timer Expired?".

The steps of the EPG control data transformation algorithm 300 form a loop that starts with the step 402 "Join EPG data channel" and continues indefinitely, with the purpose of keeping the Subscriber Terminals (STs) 204 up-to-date with program information regarding all broadcast video channels.

In the step 402 "Join EPG data channel", the channel data multicast group is selected in the EPG Tuner 210. This is invoked by the EPG Conversion Subsystem 314 to pull in the channels information data (the electronic program guide) to be sent to the STs 204 so that they can tune in to broadcast channels associated with entries in the electronic program guide. In the IPTV example the channels information data is distributed on an IP multicast channel by the service provider from a headend middleware system. The step 402 "Join EPG data channel" is repeated until data is found, as determined in the step 404 "Is data there?".

In the step 406 "Read channels information data", the EPG Conversion Subsystem 314 reads in the data that is received as a stream from the EPG Tuner 210, looks for a start of channels definitions, and constructs a channels file comprising the entire set of channels definitions. The step 406 "Read channels information data" is repeated until the channels definition is found, as determined in the step 408 "Definitions Found?".

In the step 410 "Parse Channels File and Write to Memory", the channels file is parsed and the result is written to memory.

In the step 412 "Convert to CC Format", the parsed channels file is converted to a new channels definitions file in a RTSP command and control (CC) format, and the converted file is written to memory in the step 414 "Store Converted File". Conversion is performed according to a service specific conversion algorithm, by rewriting for each channel of type broadcast a corresponding command and control access location, an RTSP Universal Resource Locator (URL) in this example.

In the step 416 "Send Channels Definitions to STs", the current converted channels definitions file is delivered to each subscriber terminal (ST) 204 through an acceptable transport mechanism which could be another multicast channel over a respective Media Link 222, or preferably a Hypertext Transfer Protocol (HTTP), Trivial File Transfer Protocol (TFTP), or other type of protocol over the respective Program Information Link 226 as shown in FIG. 3.

In the step 418 "Start Timer", a wakeup timer is set up because the EPG data needs to be monitored periodically for changes. When the timer expires as determined in the step 420 "Timer Expired?", execution of the EPG control data transformation algorithm 300 restarts at the step 402 "Join EPG data channel".

While channels definition is not standardized across delivery platforms most of the key parameters are common from platform to platform. For each particular implementation (unique service provider and associated components and middleware), a service specific conversion algorithm may be provided to normalize differences and convert the relevant channel attributes. In the example below, channel type (broadcast vs. on-demand) and the specific address where that channel is located are used so that the channel can be retrieved from the network. The EPG Conversion Subsystem (the Broadcast Channel Mapping Conversion subsystem) 314 takes in the associated metadata for the broadcast system and converts it so that each ST 204 will interpret the channel location as an on-demand asset, and invokes an RTSP command and control session 320 with the live conversion subsystem 302 to start the realtime conversion of the selected channel from the broadcast stream.

The following is an example taken from an IPTV deployment.

A four channel input data file including four channel addresses:
1|NBC|1|http://www.NBC.com|224.11.11.11|5000|
2|ABC|1|http://www.ABC.com|224.12.12.12|5000|
3|CBS|1|http://www.CBS.com|224.13.13.13|5000|
4|CBC|1|http://www.CBC.com|224.14.14.14|5000|

In this example, the symbol "|" being used as a delimiter, the value 224.10.10.11|5000| represents an IP multicast channel on address 224.10.10.11 UDP port 5000. The other fields are not relevant to channel tune in and are used for other applications within the ST 108. Proprietary implementations would also at a minimum include the key addressing elements. In non IPTV deployments, these channel identifiers would be frequency identifiers used for cable, satellite, or terrestrial deployments for example.

The corresponding converted four channel output data file would then be:
1|NBC|1|http://www.NBC.com|tv:192.168.5.7:8554/live/224.11.11.11|5000|
2|ABC|1|http://www.ABC.com|tv:192.168.5.7:8554/live/224.12.12.12|5000|
3|CBS|1|http://www.CBS.com|tv:192.168.5.7:8554/live/224.13.13.13|5000|
4|CBC|1|http://www.CBC.com|tv:192.168.5.7:8554/live/224.14.14.14|5000|

In this example output, the broadcast channel location has been changed from 224.11.11.11|5000| to tv:192.168.5.7:8554/live/224.11.11.11.5000

This string tells the client (the ST 108) to invoke a command and control session in which 192.168.5.7 is a local address, that is an IP address of the Realtime Command and Control to Broadcast Conversion subsystem 318. In this particular example the "tv:" tag is used to invoke native command and control (RTSP) capability on the ST 204. The inclusion of the original broadcast channel location allows the Realtime Command and Control to Broadcast Conversion subsystem 318 to tune in to the broadcast stream by controlling the Broadcast Tuner 208 assigned to the ST 204 and begin the ingestion and processing of the live stream for conversion.

Channel Tune in and Live Conversion Process

This section describes the process according to an embodiment of the invention that allows the ST 204 to request and establish and command and control session with the live conversion subsystem 302. This process effectively replaces the traditional broadcast media channel tune in that would normally be conducted directly between a single ST 204 and the network, by invoking the live conversion subsystem 302 which interprets a new request, tunes in to the live media and converts and delivers the stream in realtime to the ST 204.

Figure 5:
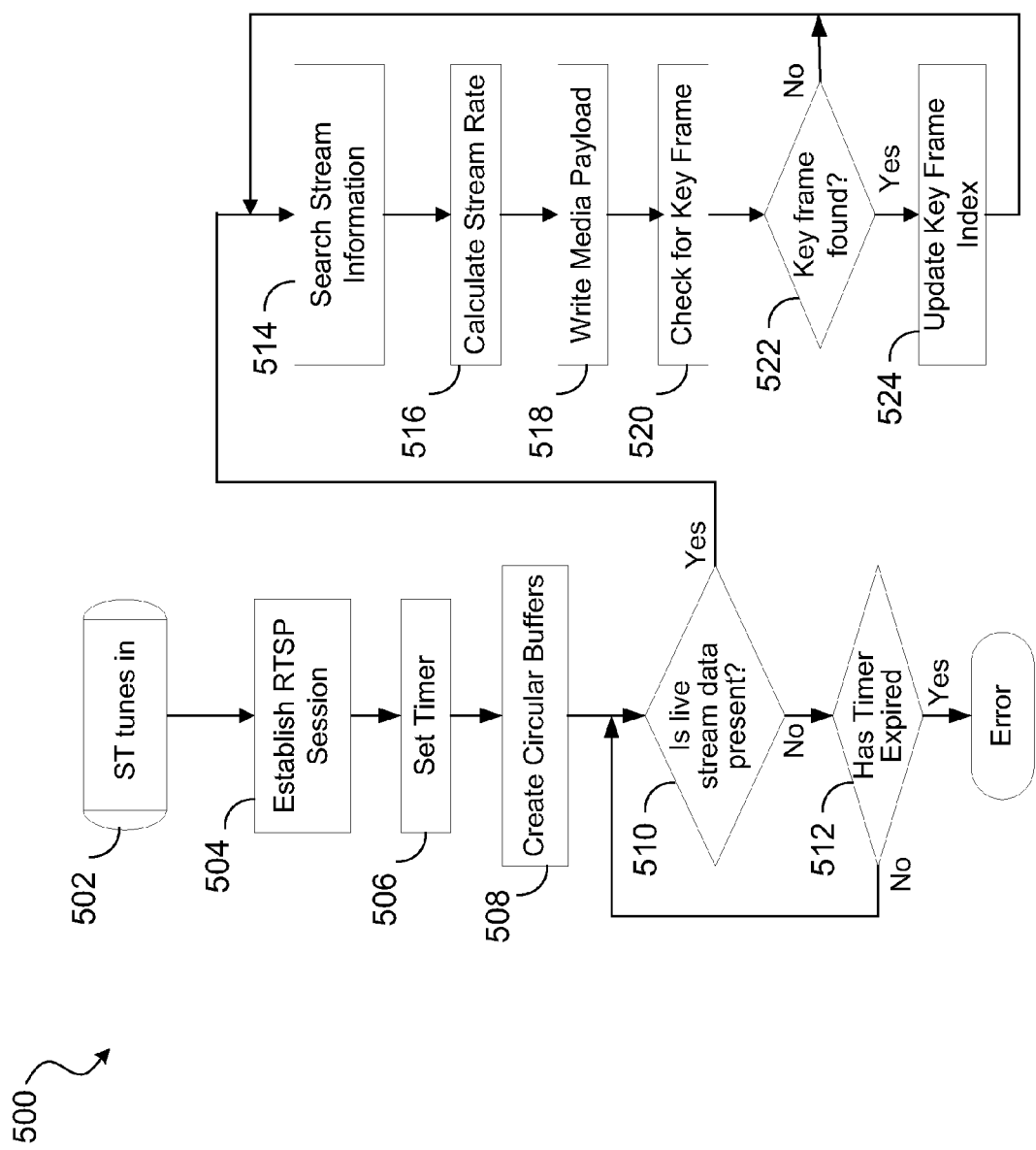
FIG. 5 illustrates flowchart steps of an initial capturing and stream conversion method 500 that may be executed in the live conversion subsystem 302 of FIG. 3.

FIG. 5 illustrates flowchart steps of an initial capturing and stream conversion method (also referred as a tune in process) 500 that may be executed in the live conversion subsystem 302, including:

a step 502: "ST tunes in";
a step 504 "Establish RTSP Session";
a step 506 "Set Timer";
a step 508 "Create Circular Buffers";
a step 510 "Is live stream data present?";
a step 512 "Has Timer Expired?";
a step 514 "Search Stream Information";
a step 516 "Calculate Stream Rate";
a step 520 "Check for Key Frame";
a step 522 "Key frame found?"; and
a step 524 "Update Key Frame Index".

The channel tune in process is described from the point of view of conducting a viewing session between a single ST 204 and its assigned corresponding Broadcast Tuner 208, it being understood that viewing sessions are able to be conducted independently and concurrently for each ST 204.

In the step 502 "ST tunes in", one of the STs 204 (here referred to simply as "the ST 204") tunes in to a broadcast channel by submitting a command & control resource in the form "RTSP://URL" to the RTSP control subsystem 316 over the CC Link 224.

In the step 504 "Establish RTSP Session", an RTSP session 320 is established with the ST. The command & control resource is parsed, the corresponding live stream location data is extracted, a suitable broadcast source (i.e. Broadcast Tuner 208) is selected, and live tune in is initiated. This live tune in command and protocol is derived from the converted channel mapping file delivered in the previous step. In the example illustrated in FIG. 5, RTSP is used as the command and control protocol,
i.e. 1|NBC|1|http://www.NBC.com|tv:192.168.5.7:8554/live/224.11.11.11|5000|

In the step 506 "Set Timer", a timer, for example an instance of the Sleep Timer 310 (FIG. 3) is started.

In the step 508 "Create Circular Buffers", two fixed length circular buffers are allocated, a receive buffer in a partition of the Media Payload Buffer 304 (FIG. 3) for buffering the media payload from the Broadcast Tuner 208, and a transmission buffer in a partition of the Output Buffer 308 for storing media packets for subsequent transmission in the form of network packets to the ST 204.

Also allocated in a partition of the Key Index table 312 is space for storing a key frame index (also referred to as a sync frame index). These local storage and buffer partitions serve as the storage for parsing and processing of all captured live media prior to output streaming. The Key Index Table 312 is continuously updated and serves as the media buffer map to support all command and control related functions.

In the step 510 "Is live stream data present?", it is determined if the requested live stream data is present. Because it may not be present at all, or not immediately present, the timer set up in the preceding step 506 "Set Timer" is periodically checked.

When the requested live stream data is not immediately present (exit "No" from the step 510), the timer is tested in the step 512 "Has Timer Expired?". As long as the timer has not expired (exit "No" from the step 512), the step 510 "Is live stream data present?" continues to wait for live stream data. If the timer expires (exit "Yes" from the step 512), an error is indicated and the initial capturing and stream conversion process is abandoned, otherwise, i.e. live stream data is found to be present before the timer expires, execution continues with the next step 514.

FIG. 5 provides an overview flow chart of the Realtime Manager Module 306, the steps 514 to 524 constituting a loop in which video packets are transferred from the Media Buffer 304 to the Output Buffer 308, while being analyzed for significant data. A detailed description of normal play and trick play functions is provided in FIGS. 6 and 7 below.

As data is captured, the capturing process will begin searching for stream structure information in the transport stream, in the step 514 "Search Stream Information". While the present invention is not specific to MPEG2 transport stream media delivery, MPEG2 is the defacto standard for service providers and stream processing references in this description relate to an MPEG2 transport stream structure. Relevant information are PAT (program access table) and PMT (program mapping table) tables in the MPEG2 transport stream. When the structure tables are found three primary pieces of information are extracted:
  a. The stream type (H.264 video, MPEG2 video, MP3 audio, etc) is determined.
  b. PID containing the PTS is determined.
  c. Once the PID has been determined, each packet is checked for a valid sync point (in the step 520 "Check for Key Frame"), and the sync frame index in the Key Index Table 312 is updated as necessary (in the steps 522 "Key frame found?" and 524 "Update Key Frame Index").

In the step 516 "Calculate Stream Rate", the stream bitrate is estimated after a certain predetermined amount of data has been received. The stream bit rate is used to communicate asset duration, that is buffer size, to the ST for command and control navigation within the live streaming media buffer.

In the step 518 "Write Media Payload", received data (received from the Broadcast Tuner 208) is copied from the Media Buffer 304 into the Output Buffer 308. The Media Buffer 304 is locked while the Output Buffer 308 is being updated. Because this buffer is also used for streaming to the ST 204, the lock prevents a streaming corruption that could arise from an overwrite of a partially transmitted media frame.

Output Buffer (308) updates are done in batches to increase the size of every IO transfer to gain a performance enhancement.

Normal Play Rate

The algorithms described below are designed to process and convert a linear broadcast live stream into a directed unicast stream which can be controlled through an inband or out of band control session. In the described example, RTSP is used which is however only one of several options. The processing elements in this system are:
  Timing calibration;
  Detection, conversion and re-insertion of key program data elements related to audio, timing and DRM (digital rights management; and
  Buffer management for seamless playback of the live stream to simulate the broadcast experience with the added command and control functionality.

Figure 6:
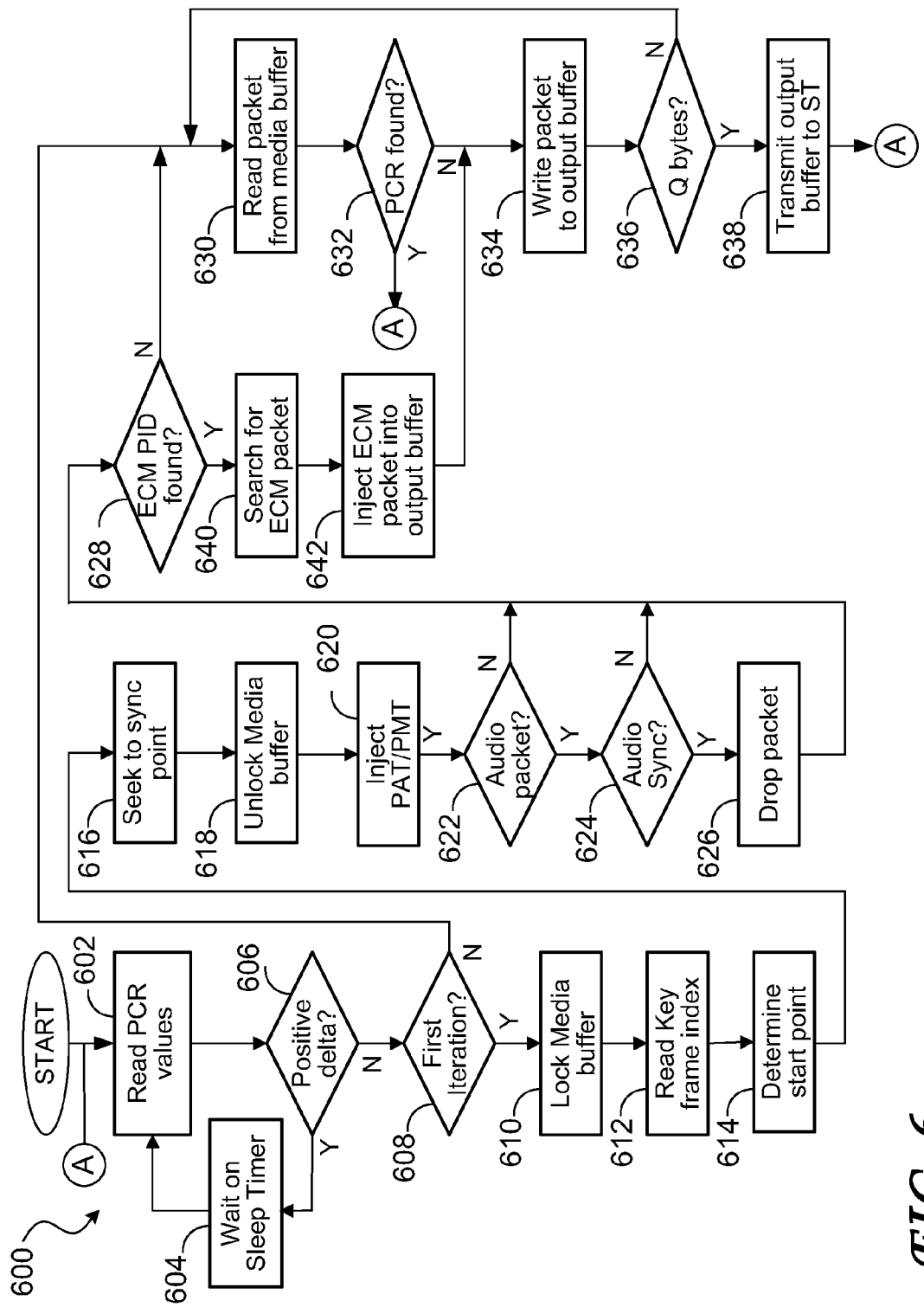
FIG. 6 is a flowchart of a normal play back algorithm 600.

FIG. 6 is a flowchart of a normal play back algorithm 600 which may be executed following the tune in process 500 of FIG. 5 when normal play has been selected by the ST 204, the normal play back algorithm 600 includes a normal playout loop which includes steps:
  602 "Read PCR values";
  604 "Wait on Sleep Timer";
  606 "Positive Delta?";
  608 "First Iteration?";
  610 "Lock Media Buffer";
  612 "Read Key frame index";
  614 "Determine start point";
  616 "Seek to sync point";
  618 "Unlock Media Buffer";
  620 "Inject PAT/PMT";
  622 "Audio Packet?";
  624 "Audio Sync?";
  626 "Drop Packet";
  628 "ECM PID found?";
  630 "Read Packet from Media Buffer";
  632 "PCR found?";
  634 "Write packet to output buffer";
  636 "Q bytes?";
  638 "Transmit output buffer to ST";
  640 "Search for ECM packet"; and
  642 "Inject ECM packet into output buffer".

After normal playout starts (label "A"), data in the form of MPEG2 packets from the selected channel arriving in a continuous stream in the Media Buffer 304 is monitored, and packets are transferred to the Output Buffer 308, to be sent to the ST 204. The series of steps of the normal play back algorithm 600 are performed in a loop in which packets present in the Media Buffer 304 are read, one packet per transition of the loop, and generally, but with some exceptions, transferred into the Output Buffer 308. The aim is to efficiently create a look-alike normal output stream from the received input stream.

After the START, and each time the point "A" is reached in the step 602 "Read PCR values", the incoming stream's Program Clock Reference (PCR) is read.

In the step 606 "Positive Delta?" the PCR is compared with the previous PCR value. If the difference is positive (exit Y from the step 604), transfer of packets to the output buffer is held by looping on the step 602 and the step 604 "Wait on Sleep Timer". PCR values continue to be read periodically until the difference is not positive (exit N from the step 604);

In the step 608 "First Iteration?" it is determined if this is the first iteration of the normal play back algorithm 600. Only if this is the first iteration (exit Y from the step 608), are the following consecutive steps 610 to 628 executed, otherwise execution skips to the step 630.

In the step 610 "Lock Media Buffer", the Media Buffer 304 is locked while a synchronization point is acquired.

In the step 612 "Read Key frame index", the Key Index Table 312 is read to locate an MPEG2 key frame index from which a start point can be determined. The start point is determined in the step 614 "Determine start point".

In the step 616 "Seek to sync point", the Media Buffer 304 is scanned to the start point determined in the previous step, thus establishing the synchronization point from which to start generating the output stream.

In the step 618 "Unlock Media Buffer" the Media Buffer 304 is unlocked.

In the step 620 "Inject PAT/PMT", the PMT—Program Map Table (PMT) or equivalently the Program Access Table (PAT) which describes information in the received Mpeg2 transport stream and was recovered from the Media Buffer 304 earlier, namely in the step 514 "Search Stream Information" (FIG. 5), is injected into the Output Buffer 308.

In the steps 622 "Audio Packet?" and the step 624 "Audio Sync?" it is determined if the present packet is an Audio Packet, specifically an Audio Sync Packet. If this is the case (exit "Y" from both steps 622 and 624), the packet is dropped in the step 626 "Drop Packet", otherwise execution continues with the step 628. Note that Audio packets are not put into the output stream until after the first iteration of the loop when audio packets are inserted alongside video packets in the output buffer as they occur in the live stream. They have different PIDs but are in the same physical buffer.

In the step 628 "ECM PID found?", it is determined whether an Entitlement Control Message (ECM) Program Identifier (PID) was found in the PMT. If it was found (exit Y from the step 628) then the Media Buffer 304 is searched backwards for the nearest ECM packet in the step 640 "Search for ECM packet", and the ECM packet is injected into the Output Buffer 308 in the step 642 "Inject ECM packet into output buffer", otherwise (exit N from the step 628) the next packet is read from the Media Buffer 304 in the next step 630.

In the step 630 "Read Packet from Media Buffer" the next packet is read from the Media Buffer 304.

In the following step 632 "PCR found?", it is determined if the current packet contains a PCR (Program Clock Reference). If yes (exit Y from step 632), the PCR packet is not written into the output buffer but execution continues at the label "A" with the step 602 "Read PCR values", otherwise (exit N from step 632) continues with the step 634 "Write packet to output buffer" in which the packet is written into the Output Buffer 308.

In the step 636 "Q bytes?", it is determined if an optimal number "Q" of bytes has been accumulated in the output buffer. When the local network is based on the Ethernet protocol, the optimal number "Q" of bytes is equal to 1316 which is seven times the number of bytes in a single MPEG2 packet. Different values would apply for the optimal number "Q" if protocols other than MPEG2 and Ethernet are employed. The steps 630 "Read Packet from Media Buffer", 632 "PCR found?", and 634 "Write packet to output buffer" are repeated until "Q" bytes have been accumulated.

In the step 638 "Transmit output buffer to ST", the last "Q" bytes in the Output Buffer 308 are transmitted in the form of a network packet through the RTSP session 320 to the ST 204. Execution of the normal playout loop then continues from the top at the label "A" with the step 602 "Read PCR values".

The steps of the normal play back algorithm 600 may also be informally summarized as follows:

While playing at 1×:
a. Determine the amount of time between the last two Program Clock Reference (PCR) values, taking clock drift into account;
  i. If the difference is positive, sleep;
  ii. Update clock drift as necessary;
b. If this is the first iteration since switching to this playback rate;
  i. Lock the recording buffer;
  ii. Using the sync frame index, determine the offset into the media buffer for the desired playback point;
  iii. Seek to this sync point;
  iv. Unlock the recording buffer;
  v. Inject PAT and PMT packets into the output stream;
  vi. If an Entitlement Control Message (ECM) Program Identifier (PID) was found in the PMT, search the buffer backwards for the nearest ECM packet and inject it into the output stream;
c. Continue reading packets from the media buffer and injecting them into the output stream until the next PCR value is reached;
  i. If this is the first iteration since switching to this playback rate, and the sync frames are in the video stream, do not start sending audio packets until an audio sync point is reached.

Stream Processing for Command and Control of Trick Play with a Live Stream

When the user elects a trick play, that is one of the play modes of "pause", "fast forward", "rewind", etc. of the live stream, there are a number of processing steps required to prepare and send the media stream to the ST. These steps center primarily around manipulating the stream so that it includes only the key frames and not the derived frames (from compression algorithms) and the subsequent preparation and insertion of data elements (timing, DRM, removal of audio, etc.) in order to make the command and control of the adjusted media stream possible.

Figure 7:
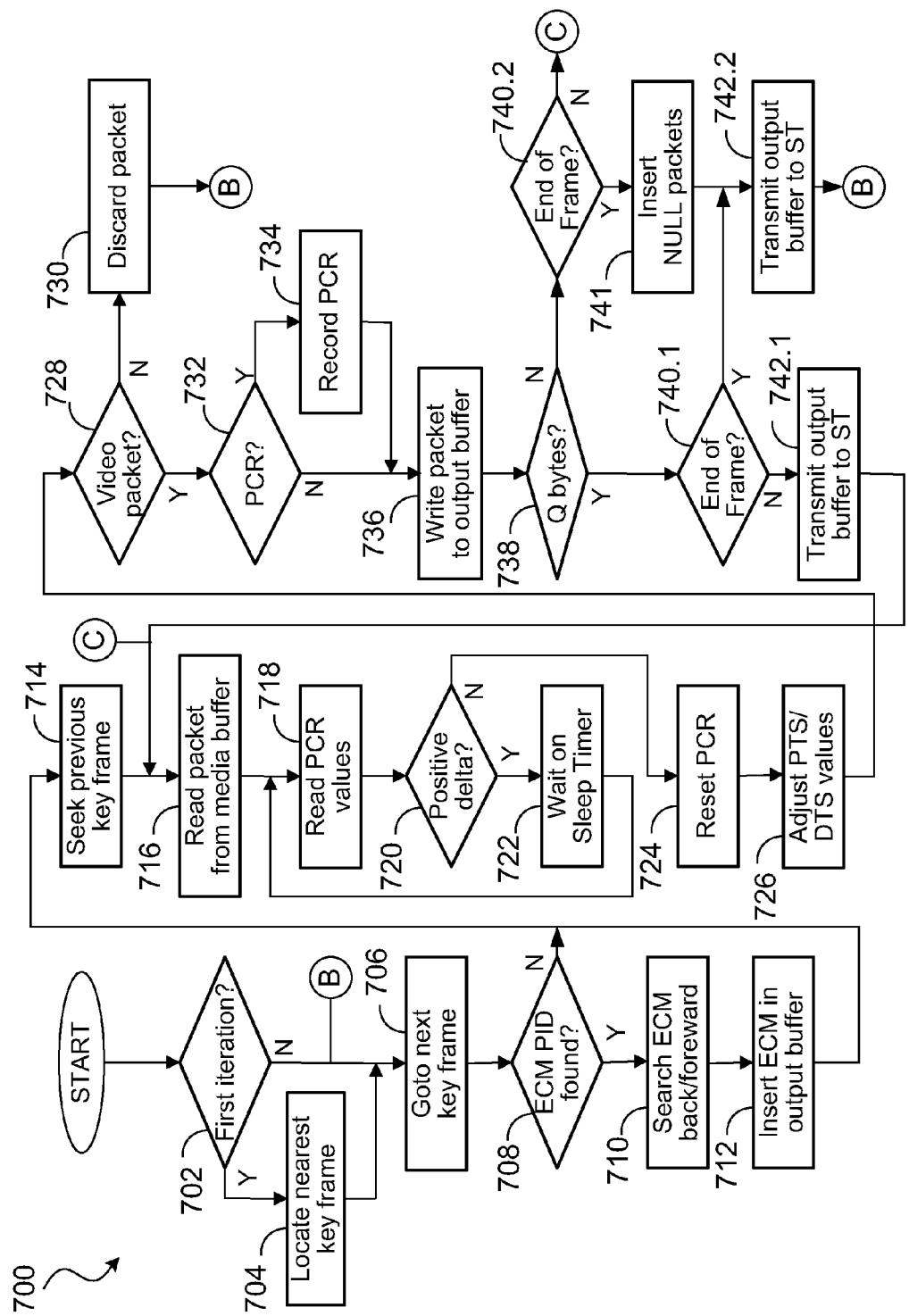
FIG. 7 is a flowchart of a trick play algorithm 700.

FIG. 7 is a flowchart of a trick play algorithm 700 including steps:
  702 "First Iteration?";
  704 "Locate nearest key frame";
  706 "Goto next key frame";
  708 "ECM PID found?";
  710 "Search ECM back/forward";
  712 "Insert ECM in Output Buffer";
  714 "Seek previous key frame";
  716 "Read Packet from Media Buffer";
  718 "Read PCR values";
  720 "Positive delta?";
  722 "Wait on Sleep Timer";
  724 "Reset PCR";
  726 "Adjust PTS/DTS values";
  728 "Video Packet?";
  730 "Discard packet";
  732 "PCR?";
  734 "Record PCR";
  736 "Write packet to output buffer";
  738 "Q bytes?";
  740.1 and 740.2 "End of Frame?";
  741 "Insert NULL packets"; and
  742.1 and 742.2 "Transmit output buffer to ST".

Some of the steps of the trick play algorithm 700 are identical to, or copies of, similar steps of the normal play back algorithm 600, but are included here under new reference numerals for clarity.

In the step 702 "First Iteration?", it is determined if this is the first iteration of the trick play algorithm 700. If it is (exit Y from the step 702) then the step 704 "Locate nearest key frame" is executed in which a packet representing the start of the nearest key frame is located in the Media Buffer 304. The meaning of "nearest" depends on whether the trick play mode is rewind in which case "nearest" means "nearest frame, K frames backwards", or fast forward in which case "nearest" means "nearest frame, K frames forward", where K is a speed-up factor selected by the ST 204, for example K=3 or K=8 for speed-up factors of times 3 or times 8.

If this is not the first iteration (exit N from the step 702) then the next step 706 is executed which represents the beginning of a trick play loop that comprises the steps 706 to 742.2, the beginning of which is marked with a label "B".

In the step 706 "Goto next key frame", the first packet of the next key frame is selected as the current packet. The meaning of "next" depends on the trick play mode, as described with reference to step 704 above.

In the step 708 "ECM PID found?" it is determined whether an Entitlement Control Message (ECM) Program Identifier (PID) was found in the PMT. If it was found (exit Y from the step 708) then the Media Buffer 304 is searched forward (or backwards depending on the trick playmode being fast-forward or rewind respectively) for the nearest ECM packet in the step 710 "Search ECM back/forward", and the ECM packet is injected into the Output Buffer 308 in the step 712 "Insert ECM in Output Buffer", otherwise (exit N from the step 708, when the ECM PID was not found) execution skips the steps 710 and 712. Execution then continues with the step 714.

The step 714 "Seek previous key frame" is analogous to the steps 704 and 706, and results in seeking to the previous key frame, where the meaning of "previous" is again dependant on the trick play mode, but in the opposite sense of that defined in the step 704.

Note that the Key Index Table 312 (FIG. 3) conveniently provides an efficient way of locating key frame packets in the Media Buffer 304 without having to scan through the buffer each time a key frame needs to be located.

In the step 716 "Read Packet from Media Buffer" which is also labeled "C", the next packet is read from the Media Buffer 304.

In the step 718 "Read PCR values" the PCR values of the last two packets are read. In the step 720 "Positive delta?" their difference is determined. If a positive delta is obtained, a pause is inserted by the step 722 "Wait on Sleep Timer", and the next pair of PCR values are read in the step 718 "Read PCR values".

Once a non-positive delta is obtained (exit N from the step 720), the PCR value of the packet is set to zero in the step 724 "Reset PCR".

In the next step 726 "Adjust PTS/DTS values", the time stamps—the Program Time Stamp (PTS) and the Decode Time Stamp (DTS)—in the packet are adjusted to match the seek rate.

In the next step 728 "Video Packet?" it is determined if the current packet is a video packet. If not (exit N from the step 728) the packet is discarded in the step 730 "Discard packet" and execution flow goes back to the beginning of the trick play loop at the label "B". In trick play, only video packets need to be forwarded to the output buffer, whereas all audio packets are discarded. When the current packet is a video packet (exit Y from the step 728), then execution continues with the next step 732.

In the step 732 "PCR?" it is determined if the current packet contains a PCR value. If it does (exit Y from the step 732), then this value is recorded in the step 734 "Record PCR". In any case, execution continues with the next step 736.

In the step 736 "Write packet to output buffer", the current packet is written into the Output Buffer 308.

In the step 738 "Q bytes?" it is determined if an optimal number "Q" of bytes has been accumulated in the output buffer. As mentioned earlier, when the local network is based on the Ethernet protocol, the optimal number "Q" of bytes is equal to 1316 in the described embodiment. Different values of "Q" may apply for other embodiments.

If less than "Q bytes" have been accumulated (exit N from the step 738) and the end of the frame has been reached as determined in the step 740.2 "End of Frame?" (exit Y from the step 740.2), then the appropriate number of NULL packets or NULL bytes to pad the buffer out to "Q" bytes are inserted in the step 741 "Insert NULL packets" before continuing to the step 742.2 "Transmit output buffer to ST", in which the contents of the Output Buffer 308, for example in the form of an Ethernet network packet payload, is transmitted through the RTSP session 320 to the ST 204. Execution of the trick play loop then resumes with another iteration from the step 706 marked with the label "B".

If "Q bytes" have not been accumulated (exit N from the step 738) and the end of the frame also has not been reached (exit N from the step 740.2 "End of Frame?"), loop execution resumes at the step 716 "Read sync packet" marked with the label "C".

Alternatively, if "Q bytes" have been accumulated (exit Y from the step 738) and the end of the frame has also been reached as determined in the step 740.1 "End of Frame?" (exit Y from the step 740.1), then the step 742.2 "Transmit output buffer to ST" is immediately executed (without insertion of NULL bytes) in which the contents of the Output Buffer 308 is transmitted to the ST 204. Execution of the trick play loop then resumes from the step 716 marked with the label "B".

But if "Q bytes" have been accumulated (exit Y from the step 738) and the end of the frame has not been reached as determined in the following step 740.1 "End of Frame?" (exit N from the step 740.1), then the step 742.1 "Transmit output buffer to ST" is executed in which the contents of the Output Buffer 308 is transmitted to the ST 204, and execution of the trick play loop then resumes at the step 716 marked with the label "C".

The algorithm for the trick play back algorithm 700 may also be informally summarized as follows:

While seeking:
  a. If this is the first iteration since switching to this seek rate;
    i. Find the offset of the nearest sync point based on the current position in the buffer;
  b. If this is NOT the first iteration since switching to this seek rate;
    i. Find the next or previous sync point—depending on direction and rate—based on the current position in the buffer;
  c. If an ECM PID was found in the PMT, search the buffer backwards for the nearest ECM packet and inject it into the output stream;
  d. Seek to the previously determined sync point in the media buffer;
  e. Read the sync packet from the media buffer;
  f. Determine the amount of time between the last two PCR values, taking clock drift and seek rate into account;
    i. If the difference is positive, sleep;
  g. Set the PCR value in the packet to 0;
  h. Adjust the PTS and DTS values in the packet by (seek rate)^2;
  i. Clear the 'has PCR' flag on the sync packet, and transmit it;
  j. Continue reading from the playback buffer until end of frame is reached;
    i. If the packet is a video packet;
      If the packet contains a PCR value, record it and clear the 'has PCR' flag;
      Transmit the adjusted packet;
  k. Flush the output buffer, injecting null packets as necessary.

ADVANTAGES

Advantageously, the described system and method of the present invention deliver a sought after live stream command and control feature to devices that did not previously or natively have the capability to implement it.

Another advantage is that there are no changes to the hardware required in the already deployed (legacy) devices or in the service provider content delivery network to enable this functionality.

A further advantage is that once this system is in place, the service provider and the consumer are not required to deploy new and more expensive devices with built in native capability to achieve the functionality described here.

Yet another advantage is that once this inline capability is delivered, it lends itself to differentiated services like bandwidth management and enhanced Personal Video Recorder (PVR) features.

Thus, an improved system and method for efficiently delivering television programs to one or more subscriber terminals in the same household, or local area network, have been provided.

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

What is claimed is:

1. A method for processing an electronic program guide (EPG) information for use in live command and control for channel tuning and for control of a video play mode by a plurality of N subscriber terminals, the method comprising:
    (a) connecting the subscriber terminals (STs) to a video broadcast subscriber link through a live conversion system controlling live streaming of a video;
    (b) receiving a broadcast stream and an EPG channel on the broadcast subscriber link, processing the received broadcast stream and transmitting the processed broadcast stream by using a Real Time Streaming Protocol (RTSP);
    (c) joining the EPG channel in an EPG tuner;
    (d) reading an EPG information on the EPG channel, and constructing from the EPG information a channels file comprising a set of channels definitions;
    (e) parsing the channels file;
    (f) converting the channels file to a converted channel map in a control and command format, comprising converting the control and command format into a RTSP control and command format; and
    (g) sending the converted channel map to each ST.

2. The method of claim 1, further comprising repeating the steps (d) to (g) at predetermined time intervals.

3. The method of claim 1, further comprising selecting a video channel from video channels contained in the broadcast stream.

4. The method of claim 3, wherein the selecting the video channel includes receiving a channel request from a ST and tuning in to the corresponding video channel in the broadcast stream.

5. The method of claim 3, further comprising:
    buffering the selected video channel in a media buffer; and
    transmitting the buffered video channel to a ST.

6. The method of claim 5, wherein the buffered video channel is transmitted to the ST as a media payload in the form of media packets.

7. The method of claim 6, wherein the processing the EPG information further comprises providing normal play and trick play processing for the selected video channel by processing the media payload with a stored key frame index.

8. The method of claim 1, wherein the broadcast stream is a multi-media broadcast provided in one of:
    an over-the-air digital radio frequency (RF) broadcast; or
    an Internet protocol (IP) multicast.

9. The method of claim 1, wherein the step (g) further comprises limiting the converted channel map to a selected subset of channels to one or more STs.

10. The method of claim 1, wherein the processing the EPG information comprises processing by one or more STs are Digital Living Network Alliance (DNLA) home network devices or mobile devices.

11. A system for processing an electronic program guide (EPG) information for use in live command and control for channel tuning and for control of a video play mode by a plurality of N subscriber terminals, the system comprising:
    a processor;
    a memory device having computer readable instructions stored thereon for execution by the processor, causing the processor to:
        (a) connect the subscriber terminals (STs) to a video broadcast subscriber link through a live conversion system controlling live streaming of a video;
        (b) receive a broadcast stream and an EPG channel on the broadcast subscriber link, process the received broadcast stream and transmit the processed broadcast stream by using a Real Time Streaming Protocol (RTSP);
        (c) join the EPG channel in an EPG tuner;
        (d) read an EPG information on the EPG channel, and construct from the EPG information a channels file comprising a set of channels definitions;
        (e) parse the channels file;
        (f) convert the channels file to a converted channel map in a control and command format, comprising converting the control and command format into a RTSP control and command format; and
        (g) send the converted channel map to each ST.

12. The system of claim 11, wherein the computer readable instructions further cause the processor to repeat the steps (d) to (g) at predetermined time intervals.

13. The system of claim 11, wherein the computer readable instructions further cause the processor to select a video channel from video channels contained in the broadcast stream.

14. The system of claim 13, wherein the computer readable instructions further cause the processor to receive a channel request from a ST and tune in to the corresponding video channel in the broadcast stream.

15. The system of claim 13, wherein the computer readable instructions further cause the processor to:
    buffer the selected video channel in a media buffer; and
    transmit the buffered video channel to a ST.

16. The system of claim 15, wherein the computer readable instructions further cause the processor to transmit the buffered video channel to the ST as a media payload in the form of media packets.

17. The system of claim 16, wherein the computer readable instructions further cause the processor to provide normal play and trick play processing for the selected video channel by processing the media payload with a stored key frame index.

18. The system of claim 11, wherein the broadcast stream is a multi-media broadcast provided in one of:
    an over-the-air digital radio frequency (RF) broadcast; or
    an Internet protocol (IP) multicast.

19. The system of claim 11, wherein the computer readable instructions further cause the processor to limit the converted channel map to a selected subset of channels to one or more STs.

20. The system of claim 11, wherein one or more STs are Digital Living Network Alliance (DNLA) home network devices or mobile devices.

* * * * *